ent Office 3,532,457
Patented Oct. 6, 1970

3,532,457
CATALYST FOR PURIFYING EXHAUST GASES
AND PROCESS OF MAKING AND USING SAME
Karl Hermann Koepernik, Hannover, Germany, assignor to Kali-Chemie Aktiengesellschaft, Hannover, Germany, a corporation of Germany
No Drawing. Filed Sept. 2, 1966, Ser. No. 576,819
Claims priority, application Germany, Sept. 23, 1965, K 57,205
Int. Cl. B01j 11/06
U.S. Cl. 23—2
15 Claims

ABSTRACT OF THE DISCLOSURE

A highly effective copper and chromium oxide catalyst of high mechanical strength properties, prolonged service life, low sensitivity to lead poisoning, and high effectiveness in the substantially complete combustion of exhaust gases of internal combustion engines is prepared by peptizing poorly crystallized boehmite (pseudoboehmite) with a volatile ammonium salt and a volatile acid, predrying and calcining the peptized boehmite at specific temperatures, impregnating the calcined alumina carrier with heat decomposable copper and chromium salts, and activating the impregnated carrier at 750° C. to 850° C. to decompose the copper and chromium salts to their oxides.

---

The present invention relates to an improved catalyst and more particularly to a catalyst suitable for the treatment of exhaust gases of internal combustion engines to remove noxious components therefrom, to a process of preparing such a catalyst and its carrier and to a process of using said catalyst in the catalytic purification of exhaust gases.

Removal of the noxious components of exhaust gases which are deleterious to health and comfort, and more particularly removal of carbon monoxide, unburned hydrocarbons, and the oxides of nitrogen from such exhaust gases represents a problem of the utmost importance in view of the ever increasing number of automobiles. One of the possibilities of purifying exhaust gases of internal combustion engines is the catalytically induced complete combustion of the exhaust gases with additional supply of air. Catalysts to be suitable for such a catalytic afterburninng of the exhaust gases must meet very high requirements. The most important properties of a highly effective exhaust gas catalyst are as follows:

(1) It must become effective at as low a temperature as possible because the exhaust gases, on cold starting, are initially of a low temperature.

(2) The catalyst must be insensitive to occasional high temperatures as they are encountered, for instance, if due to a sparkplug failure, high hydrocarbon concentrations are present in the catalyst chamber.

(3) The catalyst must possess a high resistance to shock and abrasion because it is continuously exposed to considerable strains and stresses due to the shocks, jarring, and vibrations encountered on driving.

(4) Finally the catalyst must be highly insensitive against lead poisoning.

As is known, fuels for internal combustion engines contain more or less tetra-ethyl lead as antiknock agent. The lead content of such fuel is in Germany, as an average, at 0.4–0.5 g./l. and exceeds in U.S.A. frequently 0.8 g./l. Such a high lead content of the fuel requires a very high resistance of the exhaust gas catalyst to lead poisoning.

Exhaust gas catalysts are known which meet, in general, the above enumerated requirements (1), (2), and (3). But all these catalysts are quite sensitive to lead poisoning. Catalysts containing platinum metals which due to their high oxidizing activity are the preferred catalysts for the complete combustion of exhaust gases, are especially susceptible to lead poisoning.

It is one object of the present invention to provide a highly effective and rather inexpensive catalyst which meets the above enumerated requirements (1), (2), and (3) and which, in addition thereto, is highly resistant against lead poisoning.

Another object of the present invention is to provide a simple and effective process of producing such a catalyst which is highly resistant to lead poisoning.

A further object of the present invention is to provide a catalyst carrier which, due to its improved properties, imparts to the catalyst high durability and prolonged working life and increases its resistance to lead poisoning.

Still another object of the present invention is to provide a simple and effective process of producing such a valuable catalyst carrier.

Another object of the present invention is to provide a simple and effective process of catalytically purifying exhaust gases and eliminating therefrom noxious components harmful to health and comfort.

Other objects of the present invention and advantageous features thereof will become apparent as the description proceeds.

In principle, the catalyst according to the present invention is a copper oxide-chromium oxide catalyst deposited on an aluminum oxide carrier prepared from a specific material, namely poorly crystallized boehmite, in a specific manner as it will be described hereinafter.

The starting material for the carrier is poorly crystallized boehmite, AlO(OH), or gel-type α-alumina monohydrate, also called pseudo-boehmite, having a loss on ignition between about 24% and about 30% and a sodium oxide ($Na_2O$) content less than 500 p.p.m.

Step (a): Such a poorly crystallized boehmite is finely comminuted and then pasted with a solution of an ammonium salt of a volatile acid and with a volatile acid such as acetic acid, hydrochloric acid, or nitric acid.

Step (b): The resulting paste is extruded or is shaped in another suitable manner, f.i., into spheres by granulation. The resulting extruded or otherwise molded bodies are Step (c): dried at a temperature between about 50° C. and about 70° C. until they can be broken to small pieces.

Step (d): These pieces are introduced into a furnace heated to between 220° C. and 270° C.

Step (e): Thereupon, the temperature is increased to between about 800° C. and about 900° C. and the carrier material is calcined at said temperature until the carrier material has become thermally resistant.

Step (f): The resulting catalyst carrier is then impregnated with a solution of heat-decomposable copper and chromium salts containing between about 0.5 g. atom to about 3.0 g. atoms each of copper and chromium per liter.

Step (g): The impregnated catalyst carrier is dried to remove the water and is

Step (h): rapidly heated to a temperature between about 750° C. and about 850° C. and kept at said temperature until decomposition to copper oxide and chromium oxide is completed.

The resulting catalyst has a high activity with regard to complete oxidation and combustion of the exhaust gases and is distinguished over other catalysts not only by its high mechanical strength properties but also by its low sensitivity to lead poisoning.

As stated above, the poorly crystallized boehmite serving as starting material for the production of the carrier may be obtained in a known manner by different processes. For instance, an aluminum nitrate solution may be precipitated at a pH of 8–9 by the addition of ammonia, an aluminate solution may be precipitated at the same pH by the addition of nitric acid, and aging the precipitate for several hours, or, respectively, an aluminum alcoholate or aluminum glycolate solution may be hydrolyzed. Such processes are described, for instance, in Bull. Soc. Chim. France 1958, pages 1302–1303, or in copending patent application Ser. No. 390,472 filed Aug. 18, 1964, and entitled, "High Temperature Resistant Catalyst and Process of Making Same."

Preferably, such a poorly crystallized boehmite is molded according to step (a) by extrusion. Such extrusion molding, however, reduces the pore volume of the final carrier. In order to assure the formation of a large total pore volume with a substantial amount of macropores, the following procedure must be followed.

According to step (b) the pseudo-boehmite, i.e., the gel type $\alpha$-alumina monohydrate powder is mixed with an aqueous solution of a pore producing and the pore volume increasing ammonium salt of a volatile acid and with a peptizing acid, preferably with acetic acid, hydrochloric acid, or nitric acid. The concentration of said ammonium salt as well as the peptizing acid is preferably 1% to 10%, by weight, i.e., 1 g. to 10 g. of the salt and 1 g. to 10 g. of the acid per 100 cc. of solution. The amounts of ammonium salt and peptizing acid are such that the resulting mixture has a consistency permitting molding by extruding. The preferred ammonium salt and peptizing acid are ammonium acetate and acetic acid. Other suitable ammonium salts are ammonium formate, ammonium oxalate, ammonium chloride, and in general all ammonium salts of acids which are volatile.

As stated above, the acid serves as peptizing agent and is responsible for the mechanical strength of the carrier while the ammonium salts act as pore producing agents and increase the pore volume. Thus it is possible to increase, within certain limits, either the strength or the porosity of the resulting carrier to predetermined optimum values and to produce, by proper selection of said pore-forming and peptizing agents, catalyst carriers of any desired strength and porosity.

The total amounts of ammonium salt and undiluted acid are advantageously within a range of about 0.5% and about 10% of each additive calculated for the amount of dry aluminum hydroxide gel used.

As stated above, the formation of the required large pore volume is dependent upon the manner in which the water is driven off and removed from the extruded bodies. In order to rapidly remove the water, the temperature of the drying process must be increased by following the very specific drying steps (c), (d), and (e) mentioned hereinabove.

Thus the extruded molded bodies are first dried at a temperature between about 50° C. and about 70° C. for about one hour to about four hours to yield a product which can be broken up to carrier pieces of the desired size and shapes.

After crushing the predried material, it is introduced into a calcining furnace which has been preheated to a temperature between about 220° C. and about 270° C. Therein, the temperature is increased to between about 800° C. and about 900° C. within about one hour and about two hours and the carrier material is calcined at said temperature for about two hours to about four hours. This high calcination temperature is required to impart to the carrier material its high thermal stability.

Although the specific pore volume of the carrier is quite high, it possesses satisfactory mechanical strength. Its breaking strength is between about 5 kg. and about 8 kg. when exposed to a load between two flat steel plates. Its abrasion resistance also meets the requirements.

The calcined carrier is impregnated, according to step (f), with a solution of heat-decomposable copper and chromium salts. The preferred salts are copper nitrate and ammonium dichromate. In order to produce a highly active catalyst, the impregnation solution contains preferably, per liter, between about 0.5 g. atom and about 3.0 g. atoms each of the two catalytically active metals copper and chromium.

According to steps (g) and (h) rapid and instantaneous decomposition of the copper and chromium salts to the respective oxides is achieved by introducing the impregnated and dried carrier material into a furnace preheated to between about 550° C. and about 650° C. The temperatuer of said furnace is then increased to between about 750° C. and about 850° C. at which temperature the carrier with the catalyst is kept until thermal stability is attained and the copper and chromium salts are completely decomposed to the respective oxides.

It may be pointed out that only when carefully observing all of the described steps (a)–(h) the desired object is achieved, namely to produce an exhaust gas catalyst of high mechanical strength, high activity, service life, and resistance to lead poisoning. Particularly the above given temperature and time regulations for drying and calcining the carrier material before and after its impregnation with the copper and chromium salts, have a favourable effect on the quality of the catalyst.

The following examples serve to illustrate the present invention without, however, limiting the same thereto.

EXAMPLE 1

1000 g. of $\alpha$-alumina monohydrate gel powder having a loss on ignition of 26% and a sodium oxide ($Na_2O$) content of about 300 p.p.m. and the X-ray diagram of which shows the structure of a poorly crystallized boehmite are mixed and kneaded with 750 cc. of a solution containing 1% of acetic acid and 3% ammonium acetate to yield a homogeneous paste.

The resulting paste is extruded through a piston type extruder.

The extruded bodies are dried in a large drying oven with air circulation at 60° C. and are then broken into small pieces of 4 to 6 mm. length.

They are then introduced into a furnace preheated to 250° C. and are kept at said temperature for about one hour.

Thereafter, they are calcined at about 800° C. for about three hours. The diameter of the calcined carrier bodies is in general at 13 mm., its bursting strength is 6.8 kg.

The resulting carrier material is then impregnated with a hot solution, one liter of which contains 241.6 g. (1 mole) of cupric nitrate ($Cu(NO_3)_2 \cdot 3H_2O$) and 126.0 g. (0.5 mole) of ammonium dichromate (($NH_4)_2Cr_2O_7$). The impregnated carrier material yields on subsequent drying and calcining a catalyst designated as "catalyst A."

Another portion of the same carrier material is impregnated with a solution, one liter of which contains 362.4 g. (1.5 moles) of cupric nitrate and 94.5 g. (0.375 mole) of ammonium dichromate. The impregnated carrier material yields on subsequent drying and calcining a catalyst designated as "catalyst B."

The impregnated carrier materials are dried at 120° C. and then introduced into a furnace preheated to 600° C. in order to rapidly decompose the copper and chromium salts. The temperature of the furnace is increased to 800° C. within 30 minutes and is maintained for one hour.

The resulting catalyst A contains about 12% of copper and chromium oxides, the catalyst B about 15% of said oxides.

Said catalysts are tested for their resistance to lead poisoning by installation into the exhaust gas pipe of a stationary 1.2 l. "Volkswagen" industrial motor which is operated with a brand of super fuel the lead content of which is adjusted uniformly to 0.7 g. of lead per l. The motor is operated at a constant speed of 2,500 revolutions per minute and with a brake load of about 3.6 mkg. The exhaust gas flow is divided into five channels and is passed through five catalyst chambers each containing 400 cc. of catalyst. Each volume of exhaust gas is mixed with 0.25 volume of secondary air and about 10 cu.m. of the exhaust gas are passed through each catalyst chamber per hour. When proceeding in this manner, 550 l. of fuel containing 385 g. of lead (in the form of tetra-ethyl lead) are consumed in 110 hours.

Subsequently the catalysts were tested for their activity as follows: A gas mixture containing 4%, by volume, of oxygen, 2%, by volume, of carbon monoxide, 1000 p.p.m. of n-hexane vapor, and the remainder being nitrogen is passed through the catalyst with a speed of 25,000 l./hr. per liter of catalyst. The carbon monoxide and the hexane concentrations are measured by means of two infrared gas analyzers with attached two-color-ink recording pen in dependence from the temperature of the gas mixture before entering the catalyst bed. The gas mixture passing through a heated pipe is then preheated to temperatures beginning with 100° C. and continuously increasing to 575° C. within 10 minutes. The gas temperature before entering the catalyst bed, i.e., the gas inlet temperature at which the carbon monoxide or, respectively, hexane concentration is reduced to half its initial value by subsequent catalytic combustion is designated as half-value temperature and characterizes the activity of the catalyst.

The following Table I gives the half-value temperatures of the two catalysts A and B at the beginning of the test, i.e., with fresh catalyst and after 110 hours of passing the exhaust gas derived from the fuel containing 0.7 g./l. of lead therethrough.

TABLE I

| Catalyst | Half-value temperature, ° C. | | | |
|---|---|---|---|---|
| | At 0 hours | | After 110 hours | |
| | CO | n-Hexane | CO | n-Hexane |
| Catalyst A | 220 | 280 | 435 | 460 |
| Catalyst B | 210 | 280 | 410 | 430 |

A commercially available platinum catalyst deposited on an aluminum oxide ($Al_2O_3$) carrier was tested according to the same test method. Such a catalyst shows a half-value temperature above 600° C. already after 50 hours of operation. It is evident that the catalysts prepared according to the present invention under specific drying and calcining conditions is much less sensitive to lead poisoning than the known platinum catalysts.

EXAMPLE 2

Catalyst A is prepared in the same manner as described in Example 1 whereby, however, the calcination temperature is increased.

For this purpose the extruded carrier bodies are dried at 60° C. in a large drying oven with circulating air for about 2 hours so that they can be broken up in a crushing mill provided with baffles. The carrier pieces are then introduced into a calcining furnace which is preheated to 250° C. The temperature of said furnace is increased to 900° C. within 1½ hours and the carrier material is calcined at said temperature for 3 hours.

The diameter of the resulting extruded carrier pieces is about 1.3 mm., its bursting strength exceeds 5 kg.

Impregnation of the carrier material with the copper and chromium salt solution and the decomposition of said salts to copper oxide and chromium oxide are effected in the same manner as described in Example 1.

The resulting catalyst is used in a standard "Volkswagen" type 1200 which is driven more than 30,000 km. with a gasoline the lead content of which is 0.7 g./l. 4.2 l. of the catalyst are enclosed in a muffler of a special construction. Additional air is introduced into the exhaust gas of the Volkswagen near the four exhaust valves of the motor. The secondary air was supplied by means of a blower driven by the crankshaft of the Volkswagen.

The exhaust gas concentration of the Volkswagen is determined according to the specifications of the Department of Health, Education and Welfare as published in the Federal Register No. 61 of Mar. 30, 1966, under the title, "Control of Air Pollution for New Motor Vehicles and New Motor Vehicles Engines." The following Table II shows the results achieved by using the catalyst of this example:

TABLE II

| Vehicle and distance driven | Content of the exhaust gases | |
|---|---|---|
| | CO, percent | Hydrocarbons, p.p.m. |
| Volkswagen with standard muffler without catalyst | 2.44 | 752 |
| Volkswagen with catalyst muffler and additional air supply after driving for 2,500 km | 0.41 | 197 |
| Volkswagen with catalyst muffler and additional air supply after driving for 30,000 km | 0.72 | 213 |

This table shows that the catalyst according to the present invention exhibits an excellent activity even after driving for 30,000 km. with a highly leaded fuel.

Of course many changes and variations in the starting poorly crystallized boehmite, in the poreforming ammonium salts and the peptizing acids, in the heat-decomposable copper and chromium compounds, in the concentrations and amounts of said ammonium salts, peptizing acids, and heat-decomposable copper and chromium compounds, in the drying, calcining, and decomposing temperatures used within the claimed limits, in the duration of such drying, calcining, and decomposing steps, and the like may be made by those skilled in the art in accordance with the principles set forth herein and in the claims annexed hereto.

I claim:
1. In a process of producing an exhaust gas catalyst of low sensitivity to lead poisoning, the steps which comprise
   (a) mixing comminuted poorly crystallized boehmite having a loss on ignition between about 24% and about 30% and a sodium oxide content lower than 500 p.p.m., with an aqueous solution of an ammonium salt of a volatile acid and a volatile acid wherein said volatile acids are selected from the group consisting of acetic acid, hydrochloric acid, and nitric acid to form a paste,
   (b) molding said paste,
   (c) predrying the molded bodies at a temperature between about 50° C. and about 70° C. until the predried molded bodies can be broken up to small peices, and crushing said predried bodies to catalyst carrier pieces,
   (d) introducing the crushed predried catalyst carrier material into a calcining furnace preheated to a temperature between about 220° C. and about 270° C.,
   (e) calcining the catalyst carrier material at about 800° C. to about 900° C. to render it thermally stable,
   (f) impregnating the catalyst carrier material with a solution of heat-decomposable cupric nitrate and ammonium dichromate,
   (g) drying the impregnated carrier material, and
   (h) heating the dried impregnated carrier material to between about 750° C. and about 850° C. to decompose the copper and chromium compounds to the respective oxides and to activate the catalyst.

2. The process according to claim 1, wherein the ammonium salt and volatile aicid solution used in step (a) for pasting and peptizing the poorly crystallized boehmite is a solution containing between about 1 g. and about 10 g. of the ammonium salt and between about 1 g. and about 10 g. of the volatile acid in each 100 cc. and wherein the ammonium salt and the volatile acid are added in amounts of between about 0.5 g. and about 10 g. of the ammonium salt and of between about 0.5 g.

and about 10 g. of the volatile acid for each 100 g. of the poorly crystallized boehmite.

3. The process according to claim 1, wherein the ammonium salt used in step (a) is ammonium acetate and the volatile acid used in step (a) is acetic acid.

4. The process according to claim 1, wherein the solution of the heat-decomposable copper and chromium compounds used in step (f) contains between about 0.5 g. atom and about 3 g. atoms of each of copper and chromium in one liter of said solution.

5. The process according to claim 1, wherein the molding operation of step (b) is extrusion molding.

6. The process according to claim 1, wherein the molded bodies obtained in step (b) are predried according to step (c) at about 50° C. to about 70° for about one hour to about four hours, the crushed predried catalyst carrier material is introduced according to step (d) into the calcining furnace preheated to between about 220° C. and about 270° C., the temperature of said calcining furnace is increased according to step (e) to about 800° C. to about 900° C. within about one hour to two hours, and the catalyst carrier material is calcined at said temperature for about two hours to about four hours.

7. The process according to claim 1, wherein the impregnated carrier material is dried according to step (g) at a temperature of about 100° C. and about 130° C., the calcining furnace is preheated to about 550° C. to about 650° C., the dried carrier material is introduced into the thus preheated calcining furnace, whereafter the temperature of the calcining furnace is increased according to step (h) to between about 750° C. and 850° C. within a period of time not exceeding one hour and the furnace is kept at said temperature for about 30 minutes to about 90 minutes.

8. The process according to claim 1, wherein the ammonium salt and volatile acid solution used in step (a) for pasting and peptizing the poorly crystallized boehmite is a solution containing between about 1 g. and about 10 g. of the ammonium salt and between about 1 g. and about 10 g. of the volatile acid in each 100 cc. and wherein the ammonium salt and the volatile acid are added in amounts of between about 0.5 g. and about 10 g. of the ammonium salt and of between about 0.5 g. and about 10 g. of the volatile acid for each 100 g. of the poorly crystallized boehmite.

9. The process according to claim 1, wherein the solution of the heat-decomposable copper and chromium compounds used in step (f) contains between about 0.5 g. atom and about 3 g. atoms of each of copper and chromium in one liter of said solution.

10. The process according to claim 1 wherein the molded bodies obtained in step (b) are predried according to step (c) at about 50° C. to about 70° C. for about one hour to about four hours, the crushed predried catalyst carrier material is introduced according to step (d) into the calcining furnace preheated to between about 220° C. and about 270° C., the temperature of said calcining furnace is increased according to step (e) to about 800° C. to about 900° C. within about one hour to two hours, and the catalyst carrier material is calcined at said temperature for about two hours to about four hours.

11. The process according to claim 1, wherein the impregnated carrier material is dried according to step (g) at a temperature of about 100° C. and about 130° C. the calcining furnace is preheated to about 550° C. to about 650° C., the dried carrier material is introduced into the thus preheated calcining furnace, whereafter the temperature of the calcining furnace is increased according to step (h) to between about 750° C. and 850° C. within a period of time not exceeding one hour and the furnace is kept at said temperature for about 30 minutes to about 90 minutes.

12. The process according to claim 1, wherein the poorly crystallized boehmite is a boehmite having a loss on ignition between about 24% and about 30% and a sodium oxide content lower than 500 p.p.m., the ammonium salt used in step (a) is ammonium acetate and the volatile acid used in step (a) is acetic acid, said ammonium acetate and acetic acid being used as an aqueous solution of between about 1 g. and about 10 g. of ammonium acetate and between about 1 g. and about 10 g. of acetic acid in each 100 cc. of said solution and the amounts of ammonium acetate and acetic acid added to the poorly crystallized boehmite being between about 0.5 g. and about 10 g. of ammonium acetate and between about 0.5 g. and about 10 g. of acetic acid for each 100 g. of said poorly crystallized boehmite, wherein the molding operation of step (b) is extrusion molding, and the bodies thereby obtained are predried according to step (c) at about 50° C. to about 70° C. for about one hour to about four hours, the crushed predried catalyst carrier material is introduced according to step (d) into the calcining furnace preheated to between about 220° C. and about 270° C., the temperature of said calcining furnace is increased according to step (e) to about 800° C. to about 900° C. within about one hour to two hours, and the catalyst carrier material is calcined at said temperature for about two hours to about four hours, wherein the said cupric nitrate and ammonium dichromate are employed in aqueous solution containing between about 0.5 g. atom and about 3 g. atoms of copper and between about 0.5 g. atom and about 3 g. atoms of chromium in one liter of said solution, and wherein the impregnated carrier material is dried according to step (g) at a temperature of about 100° C. and about 130° C., the calcining furnace is preheated to about 550° C. to about 650° C., the dried carrier material is introduced into the thus preheated calcining furnace, whereafter the temperature of the calcining furnace is increased according to step (h) to between about 750° C. and 850° C. within a period of time not exceeding one hour and the furnace is kept at said temperature for about 30 minutes to about 90 minutes.

13. Catalyst for purifying exhaust gases of high activity and resistance to lead poisoning, said catalyst being prepared according to claim 1, the amounts of copper and chromium oxides in said catalyst being catalytically effective amounts.

14. Catalyst carrier material useful as catalyst carrier for an exhaust gas catalyst of low sensitivity to lead poisoning, said catalyst carrier material being produced by
 (a) mixing comminuted poorly crystallized boehmite having a loss on ignition between about 24% and about 30% and a sodium oxide content lower than 500 p.p.m. with an aqueous solution of an ammonium salt of a volatile acid and a volatile acid wherein said volatile acids are selected from the group consisting of acetic acid, hydrochloric acid, and nitric acid to form a paste,
 (b) molding said paste,
 (c) predrying the molded bodies at a temperature between about 50° C. and about 70° C. until the predried molded bodies can be broken up to small pieces, and crushing said predried bodies to catalyst carrier pieces,
 (d) introducing the crushed predried catalyst carrier material into a calcining furnace preheated to a temperature between about 220° C. and about 270° C., and
 (e) calcining the catalyst carrier material at about 800° C. to about 900° C. to render it thermally stable.

15. In a process of purifying exhaust gases of internal combustion engines, the step which comprises passing the exhaust gases together with additional air in an amount at least sufficient to effect substantially complete combustion of said exhaust gases, through a catalyst chamber containing the catalyst prepared according to claim 1.

(References on following page)

References Cited

UNITED STATES PATENTS

| | | | |
|---|---|---|---|
| 3,374,183 | 3/1968 | Cooper | 252—463 |
| 2,800,518 | 7/1957 | Pitzer | 260—683.3 |
| 2,369,734 | 2/1945 | Heard | 196—52 |
| 2,406,646 | 8/1946 | Webb | 252—254 |
| 3,291,564 | 12/1966 | Kearby | 23—2 |
| 2,296,406 | 9/1942 | Spicer | 252—251 |
| 2,774,744 | 12/1956 | Barrett | 252—465 |
| 2,280,060 | 4/1942 | Burk | 252—232 |
| 2,932,620 | 4/1960 | Von Fuener | 252—465 |

DANIEL E. WYMAN, Primary Examiner

P. M. FRENCH, Assistant Examiner

U.S. Cl. X.R.

252—463, 465